(12) United States Patent
Lauer

(10) Patent No.: US 8,452,276 B2
(45) Date of Patent: May 28, 2013

(54) DIFFERENTIATED SERVICES CODE POINT MIRRORING FOR WIRELESS COMMUNICATIONS

(75) Inventor: Bryan A. Lauer, Hinckley, IL (US)

(73) Assignee: GoGo LLC, Itasca, IL (US)

( * ) Notice: Subject to any disclaimer, the term of this patent is extended or adjusted under 35 U.S.C. 154(b) by 0 days.

(21) Appl. No.: 13/009,687

(22) Filed: Jan. 19, 2011

(65) Prior Publication Data

US 2011/0268096 A1 Nov. 3, 2011

Related U.S. Application Data

(63) Continuation-in-part of application No. 12/060,674, filed on Apr. 1, 2008, now Pat. No. 8,081,968, which is a continuation-in-part of application No. 11/492,545, filed on Jul. 24, 2006, now Pat. No. 7,751,815, which is a continuation of application No. 10/730,329, filed on Dec. 7, 2003, now Pat. No. 7,113,780, which is a continuation-in-part of application No. 09/686,923, filed on Oct. 11, 2000, now Pat. No. 6,788,935.

(51) Int. Cl.
*H04W 84/06* (2009.01)
(52) U.S. Cl.
USPC .......................................... 455/431; 370/231
(58) Field of Classification Search
USPC ................. 370/231, 410, 316, 338, 323, 400, 370/395.4, 392, 389, 412; 455/563, 445, 455/404.1, 431, 567, 188.1, 343.2, 453
See application file for complete search history.

(56) References Cited

U.S. PATENT DOCUMENTS

| | | | |
|---|---|---|---|
| 3,659,085 | A | 4/1972 | Potter et al. |
| 4,115,777 | A | 9/1978 | Taylor |
| 4,654,867 | A | 3/1987 | Labedz et al. |
| 5,042,027 | A | 8/1991 | Takase et al. |
| 5,123,112 | A | 6/1992 | Choate |
| 5,134,709 | A | 7/1992 | Bi et al. |
| 5,212,804 | A | 5/1993 | Choate |
| 5,408,515 | A | 4/1995 | Bhagat et al. |
| 5,432,841 | A | 7/1995 | Rimer |
| 5,519,761 | A | 5/1996 | Gilhousen |
| 5,543,779 | A | 8/1996 | Aspesi et al. |
| 5,555,444 | A | 9/1996 | Diekelman et al. |
| 5,590,395 | A | 12/1996 | Diekelman |
| 5,651,050 | A | 7/1997 | Bhagat et al. |

(Continued)

FOREIGN PATENT DOCUMENTS

| | | |
|---|---|---|
| WO | WO-2001046822 A1 | 6/2001 |
| WO | WO-2006128946 A1 | 12/2006 |
| WO | WO-2008048742 A1 | 4/2008 |

OTHER PUBLICATIONS

In the US Patent and Trademark Office U.S. Appl. No. 12/021,169, Final Office Action dated Apr. 21, 2011, 12 pages.

(Continued)

*Primary Examiner* — Kiet Doan
(74) *Attorney, Agent, or Firm* — Patton Boggs LLP

(57) ABSTRACT

The DSCP Mirroring System enables the automatic reuse of the Differentiated Services Code Point header by the user devices that are served by a network to enable delivery of wireless services to the individually identified user wireless devices and manage the various data traffic and classes of data to optimize or guarantee performance, low latency, and/or bandwidth without the overhead of the management of the Differentiated Services Code Point header.

12 Claims, 7 Drawing Sheets

U.S. PATENT DOCUMENTS

| | | | |
|---|---|---|---|
| 5,659,304 | A | 8/1997 | Chakraborty |
| 5,678,174 | A | 10/1997 | Tayloe |
| 5,740,535 | A | 4/1998 | Rune |
| 5,754,959 | A | 5/1998 | Ueno et al. |
| 5,805,683 | A | 9/1998 | Berberich, Jr. |
| 5,826,188 | A | 10/1998 | Tayloe et al. |
| 5,832,380 | A | 11/1998 | Ray et al. |
| 5,848,359 | A | 12/1998 | Furtaw |
| 5,887,258 | A | 3/1999 | Lemozit et al. |
| 5,950,129 | A | 9/1999 | Schmid et al. |
| 5,956,644 | A | 9/1999 | Miller et al. |
| 5,970,395 | A | 10/1999 | Weiler et al. |
| 5,995,805 | A | 11/1999 | Ogasawara et al. |
| 5,995,833 | A | 11/1999 | Zicker |
| 6,002,944 | A | 12/1999 | Beyda |
| 6,009,330 | A | 12/1999 | Kennedy, III et al. |
| 6,040,781 | A | 3/2000 | Murray |
| 6,055,425 | A | 4/2000 | Sinivaara |
| 6,104,926 | A | 8/2000 | Hogg et al. |
| 6,144,338 | A | 11/2000 | Davies |
| 6,195,529 | B1 | 2/2001 | Linz et al. |
| 6,201,797 | B1 | 3/2001 | Leuca et al. |
| 6,233,448 | B1 | 5/2001 | Alperovich et al. |
| 6,263,206 | B1 | 7/2001 | Potochniak et al. |
| 6,304,762 | B1 | 10/2001 | Myers et al. |
| 6,314,286 | B1 | 11/2001 | Zicker |
| 6,321,084 | B1 | 11/2001 | Horrer |
| 6,324,398 | B1 | 11/2001 | Lanzerotti et al. |
| 6,353,734 | B1 | 3/2002 | Wright et al. |
| 6,392,692 | B1 | 5/2002 | Monroe |
| 6,393,281 | B1 | 5/2002 | Capone et al. |
| 6,418,327 | B1 | 7/2002 | Carey et al. |
| 6,430,412 | B1 | 8/2002 | Hogg et al. |
| 6,519,266 | B1 | 2/2003 | Manning et al. |
| 6,545,601 | B1 | 4/2003 | Monroe |
| 6,567,408 | B1 | 5/2003 | Li et al. |
| 6,570,851 | B1 * | 5/2003 | Koskelainen et al. ........ 370/231 |
| 6,577,419 | B1 | 6/2003 | Hall et al. |
| 6,580,915 | B1 | 6/2003 | Kroll |
| 6,614,774 | B1 | 9/2003 | Wang |
| 6,615,052 | B1 | 9/2003 | Parmenter |
| 6,643,496 | B1 | 11/2003 | Shimoyama et al. |
| 6,690,928 | B1 | 2/2004 | Konishi et al. |
| 6,700,902 | B1 | 3/2004 | Meyer |
| 6,735,438 | B1 | 5/2004 | Sabatino |
| 6,735,500 | B2 | 5/2004 | Nicholas et al. |
| 6,741,841 | B1 | 5/2004 | Mitchell |
| 6,754,489 | B1 | 6/2004 | Roux |
| 6,757,712 | B1 | 6/2004 | Bastian et al. |
| 6,760,778 | B1 | 7/2004 | Nelson et al. |
| 6,788,935 | B1 | 9/2004 | McKenna et al. |
| 6,795,408 | B1 | 9/2004 | Hiett |
| 6,799,037 | B1 | 9/2004 | Mielke et al. |
| 6,810,527 | B1 | 10/2004 | Conrad et al. |
| 6,880,750 | B2 | 4/2005 | Pentel |
| 6,889,042 | B2 | 5/2005 | Rousseau et al. |
| 6,910,628 | B1 | 6/2005 | Sehr |
| 6,937,597 | B1 | 8/2005 | Rosenberg et al. |
| 6,944,169 | B1 * | 9/2005 | Yoshizawa et al. ............ 370/410 |
| 6,948,003 | B1 | 9/2005 | Newman et al. |
| 6,963,292 | B1 | 11/2005 | White |
| 7,003,293 | B2 | 2/2006 | D'Annunzio |
| 7,027,801 | B1 | 4/2006 | Hall et al. |
| 7,050,755 | B2 | 5/2006 | Kline |
| 7,062,268 | B2 | 6/2006 | McKenna |
| 7,107,062 | B2 | 9/2006 | Cruz et al. |
| 7,131,136 | B2 | 10/2006 | Monroe |
| 7,280,535 | B1 | 10/2007 | Bergman et al. |
| 7,346,677 | B1 * | 3/2008 | Mohaban et al. ............. 709/224 |
| RE40,476 | E | 9/2008 | Leuca et al. |
| 7,433,836 | B1 | 10/2008 | August et al. |
| 7,447,804 | B2 | 11/2008 | Koo |
| 7,486,690 | B2 | 2/2009 | Maeda |
| 7,526,762 | B1 | 4/2009 | Astala et al. |
| 7,599,691 | B1 | 10/2009 | Mitchell |
| 2002/0010633 | A1 | 1/2002 | Brotherston |
| 2002/0045444 | A1 | 4/2002 | Usher et al. |
| 2002/0059614 | A1 | 5/2002 | Lipsanen et al. |
| 2002/0082912 | A1 | 6/2002 | Batachia et al. |
| 2002/0090931 | A1 | 7/2002 | Papineau et al. |
| 2002/0123344 | A1 | 9/2002 | Criqui et al. |
| 2002/0155833 | A1 | 10/2002 | Borel |
| 2003/0032426 | A1 | 2/2003 | Gilbert et al. |
| 2003/0046118 | A1 | 3/2003 | O'Donnell |
| 2003/0046701 | A1 | 3/2003 | O'Donnell |
| 2003/0050746 | A1 | 3/2003 | Baiada et al. |
| 2003/0055975 | A1 | 3/2003 | Nelson et al. |
| 2003/0084108 | A1 | 5/2003 | Syed |
| 2003/0093187 | A1 | 5/2003 | Walker |
| 2003/0100315 | A1 | 5/2003 | Rankin |
| 2003/0103521 | A1 | 6/2003 | Raphaeli et al. |
| 2003/0109245 | A1 | 6/2003 | McCalmont et al. |
| 2004/0063433 | A1 | 4/2004 | Garrison |
| 2004/0102188 | A1 | 5/2004 | Boyer et al. |
| 2004/0137840 | A1 | 7/2004 | La Chapelle et al. |
| 2004/0142658 | A1 | 7/2004 | McKenna et al. |
| 2004/0152446 | A1 | 8/2004 | Saunders et al. |
| 2004/0203918 | A1 | 10/2004 | Moriguchi et al. |
| 2005/0053026 | A1 | 3/2005 | Mullan et al. |
| 2005/0071076 | A1 | 3/2005 | Baiada et al. |
| 2005/0216938 | A1 | 9/2005 | Brady et al. |
| 2005/0220055 | A1 | 10/2005 | Nelson et al. |
| 2005/0221875 | A1 | 10/2005 | Grossman et al. |
| 2006/0009262 | A1 | 1/2006 | Hamm |
| 2006/0048196 | A1 | 3/2006 | Yau |
| 2006/0064746 | A1 | 3/2006 | Aaron et al. |
| 2006/0229070 | A1 | 10/2006 | de La Chapelle et al. |
| 2007/0021117 | A1 | 1/2007 | McKenna et al. |
| 2007/0042772 | A1 | 2/2007 | Salkini et al. |
| 2007/0064604 | A1 | 3/2007 | Chen et al. |
| 2007/0087756 | A1 | 4/2007 | Hoffberg |
| 2007/0105600 | A1 | 5/2007 | Mohanty et al. |
| 2007/0111725 | A1 | 5/2007 | Kauffman et al. |
| 2007/0161347 | A1 | 7/2007 | Ma et al. |
| 2007/0274294 | A1 | 11/2007 | Sasaki et al. |
| 2007/0281682 | A1 | 12/2007 | Raju et al. |
| 2008/0039076 | A1 | 2/2008 | Ziarno et al. |
| 2008/0070601 | A1 | 3/2008 | Brueckheimer et al. |
| 2008/0090546 | A1 | 4/2008 | Dickinson et al. |
| 2009/0016339 | A1 | 1/2009 | Tanizawa et al. |
| 2009/0080368 | A1 | 3/2009 | Bengeult et al. |

OTHER PUBLICATIONS

In the US Patent and Trademark Office U.S. Appl. No. 12/137,995, Non-Final Office Action dated Jul. 27, 2011, 14 pages.

In the US Patent and Trademark Office in re: U.S. Appl. No. 07/847,920, Final Office Action dated Aug. 22, 1995, number of pages unknown.

In the US Patent and Trademark Office in re: U.S. Appl. No. 07/847,920, Final Office Action dated Mar. 21, 1996, number of pages unknown; and corresponding response dated Mar. 27, 1996, number of pages unknown.

In the US Patent and Trademark Office in re: U.S. Appl. No. 07/847,920, Non-Final Office Action dated Feb. 27, 1995, number of pages unknown; and corresponding response dated May 24, 1995, number of pages unknown.

In the US Patent and Trademark Office in re: U.S. Appl. No. 07/847,920, Non-Final Office Action dated Jan. 27, 1994, number of pages unknown; and corresponding response dated May 31, 1994, number of pages unknown; and supplemental response dated Sep. 20, 1994, number of pages unknown.

In the US Patent and Trademark Office in re: U.S. Appl. No. 07/847,920, Non-Final Office Action dated Jul. 30, 1993, number of pages unknown; and corresponding response dated Oct. 26, 1993, number of pages unknown.

In the US Patent and Trademark Office in re: U.S. Appl. No. 08/027,333, Non-Final Office Action dated Jun. 24, 1994, number of pages unknown; and corresponding response dated Dec. 22, 1994, number of pages unknown.

In the US Patent and Trademark Office in re: U.S. Appl. No. 08/709,417, Final Office Action dated Jun. 11, 1998, number of pages unknown; and corresponding response dated Aug. 3, 1998, number of pages unknown.

In the US Patent and Trademark Office in re: U.S. Appl. No. 08/709,417, Non-Final Office Action dated Feb. 18, 1998, number of pages unknown; and corresponding response dated Apr. 20, 1998, number of pages unknown.
In the US Patent and Trademark Office in re: U.S. Appl. No. 08/960,183, Non-Final Office Action dated Nov. 5, 1999, number of pages unknown.
In the US Patent and Trademark Office in re: U.S. Appl. No. 08/960,183, Non-Final Office Action dated Nov. 5, 1999, number of pages unknown; and corresponding response dated Dec. 6, 1999, number of pages unknown.
In the US Patent and Trademark Office in re: U.S. Appl. No. 09/379,825, Non-Final Office Action dated May 11, 2001, number of pages unknown; and corresponding response dated May 29, 2001, number of pages unknown.
In the US Patent and Trademark Office in re: U.S. Appl. No. 09/686,923, Final Office Action dated Dec. 2, 2003, number of pages unknown; and corresponding response dated Jan. 9, 2004, number of pages unknown; and supplemental response dated Feb. 20, 2004, number of pages unknown.
In the US Patent and Trademark Office in re: U.S. Appl. No. 09/686,923, Non-Final Office Action dated Jul. 8, 2003, number of pages unknown; and corresponding response dated Sep. 29, 2003, number of pages unknown.
In the US Patent and Trademark Office in re: U.S. Appl. No. 10/730,329, Final Office Action dated Nov. 25, 2005, 16 pages; and corresponding response dated Jan. 25, 2006, 32 pages; supplemental response dated Feb. 17, 2006, 31 pages; supplemental response dated Feb. 17, 2006, 28 pages; supplemental response dated Mar. 27, 2006, 21 pages; and supplemental response dated Apr. 14, 2006, 21 pages.
In the US Patent and Trademark Office in re: U.S. Appl. No. 10/730,329, Final Office Action dated Nov. 25, 2005, 16 pages.; corresponding response dated Jan. 25, 2006, 32 pages; supplemental response dated Feb. 17, 2006, 31 pages; additional supplemental response dated Mar. 27, 2006, 21 pages; and additional supplemental response with RCE dated Apr. 14, 2006, 21 pages.
In the US Patent and Trademark Office in re: U.S. Appl. No. 10/730,329, Non-Final Office Action dated May 18, 2005, 9 pages; and corresponding response dated Aug. 18, 2005, 34 pages.
In the US Patent and Trademark Office in re: U.S. Appl. No. 11/414,873, Non-Final Office Action dated Oct. 15, 2009, 7 pages; and corresponding response dated Dec. 9, 2009, 6 pages (includes Terminal Disclaimer).
In the US Patent and Trademark Office in re: U.S. Appl. No. 11/492,545, Final Office Action dated Dec. 19, 2008, 18 pages; and corresponding response dated Jan. 27, 2009, 34 pages; and supplemental response dated Apr. 17, 2009, 35 pages.
In the US Patent and Trademark Office in re: U.S. Appl. No. 11/492,545, Final Office Action dated Nov. 19, 2009, 19 pages; and corresponding response dated Feb. 9, 2010, 15 pages.
In the US Patent and Trademark Office in re: U.S. Appl. No. 11/492,545, Non-Final Office Action dated Aug. 7, 2008, 19 pages; and corresponding response dated Oct. 10, 2008, 29 pages.
In the US Patent and Trademark Office in re: U.S. Appl. No. 11/492,545, Non-Final Office Action dated Jun. 10, 2009, 20 pages; and corresponding response dated Sep. 3, 2009, 32 pages.
In the US Patent and Trademark Office in re: U.S. Appl. No. 11/590,146, Final Office Action dated Mar. 31, 2009, 9 pages; and corresponding response dated May 29, 2009, 16 pages.
In the US Patent and Trademark Office in re: U.S. Appl. No. 11/590,146, Non-Final Office Action dated Sep. 24, 2008, 12 pages; and corresponding response dated Jan. 29, 2009, 13 pages.
In the US Patent and Trademark Office in re: U.S. Appl. No. 12/021,125, Non-Final Office Action dated Jun. 10, 2010, 12 pages.
In the US Patent and Trademark Office in re: U.S. Appl. No. 12/021,133, Non-Final Office Action dated Jun. 18, 2009, 14 pages; and corresponding response dated Sep. 9, 2009, 19 pages.
In the US Patent and Trademark Office in re: U.S. Appl. No. 12/021,169, Final Office Action dated Jun. 8, 2010, 8 pages.
In the US Patent and Trademark Office in re: U.S. Appl. No. 12/021,169, Non-Final Office Action dated Jan. 15, 2010, 8 pages; and corresponding response dated Apr. 8, 2010, 13 pages.
In the US Patent and Trademark Office in re: U.S. Appl. No. 12/021,169, Non-Final Office Action dated Jul. 14, 2009 (10 pages); response filed Oct. 7, 2009 (16 pages).
In the US Patent and Trademark Office in re: U.S. Appl. No. 12/021,169, Non-Final Office Action dated Nov. 10, 2010, 10 pages.
In the US Patent and Trademark Office in re: U.S. Appl. No. 12/029,298, Non-Final Office Action dated Jun. 22, 2010, 11 pages.
In the US Patent and Trademark Office in re: U.S. Appl. No. 12/060,645, Final Office Action dated Apr. 4, 2011, 13 pages.
In the US Patent and Trademark Office in re: U.S. Appl. No. 12/060,645, Non-Final Office Action dated Nov. 3, 2010, 19 pages.
In the US Patent and Trademark Office in re: U.S. Appl. No. 12/060,662, Final Office Action dated Apr. 4, 2011, 20 pages.
In the US Patent and Trademark Office in re: U.S. Appl. No. 12/060,662, Non-Final Office Action dated Nov. 18, 2010, 26 pages.
In the US Patent and Trademark Office in re: U.S. Appl. No. 12/060,674, Final Office Action dated Apr. 5, 2011, 19 pages.
In the US Patent and Trademark Office in re: U.S. Appl. No. 12/060,674, Final Office Action dated Jan. 15, 2010, 11 pages; and corresponding response dated Apr. 8, 2010, 19 pages (includes Request For Continued Examination).
In the US Patent and Trademark Office in re: U.S. Appl. No. 12/060,674, Non-Final Office Action dated Jul. 9, 2009, 14 pages; and response filed Oct. 9, 2009, 17 pages.
In the US Patent and Trademark Office in re: U.S. Appl. No. 12/060,674, Non-Final Office Action dated Nov. 22, 2010, 13 pages.
In the US Patent and Trademark Office in re: U.S. Appl. No. 12/182,834, Final Office Action dated Nov. 20, 2009, 8 pages.
In the US Patent and Trademark Office in re: U.S. Appl. No. 12/182,834, Non-Final Office Action dated Feb. 8, 2011, 8 pages.
In the US Patent and Trademark Office in re: U.S. Appl. No. 12/182,834, Non-Final Office Action dated Jul. 8, 2009, 13 pages; and response dated Sep. 14, 2009, 11 pages.
In the US Patent and Trademark Office in re: U.S. Appl. No. 12/423,555, Final Office Action dated Mar. 24, 2010, 9 pages.
In the US Patent and Trademark Office in re: U.S. Appl. No. 12/423,555, Non-Final Office Action dated Nov. 10, 2009, 7 pages; and corresponding response dated Feb. 8, 2010, 13 pages.
Casewell, I.E.; "The Provision of GSM Cellular Radio Environments With Passenger Aircraft Operating Over Europe"; IEEE Fifth International Conference; Dec. 11-14, 1989; pp. 172-176.
International Search Report issued Dec. 29, 2009 in co-pending application PCT/US09/036158.
International Search Report issued Jul. 17, 2009 in co-pending application PCT/US2009/042788.
International Search Report issued Nov. 6, 2009 in co-pending application PCT/US2009/036155.
Li et al.; "Airborne Operation of Portable Electronic Devices"; IEEE Antenna's and Propagation Magazine; vol. 44, No. 4; Aug. 2002; pp. 30-39.
Papavramidis et al.; "Adaptation Of Land Mobile Systems For Onboard Operation"; IEEE Conference; 1993; pp. 258-263.
Uhlirz; "Concept of a GSM-based Communication System for High-Speed Trains"; 1994 IEEE 44th Vehicular Technology Conference; Stockholm; Jun. 8-10, 1994; pp. 1130-1134.

* cited by examiner

DIFFERENTIATED SERVICES CODE POINT MIRRORING FOR WIRELESS COMMUNICATIONS

CROSS-REFERENCE TO RELATED APPLICATIONS

This application is related to U.S. patent application Ser. No. 13/009,579 filed Jan. 19, 2011.

FIELD OF THE INVENTION

This Differentiated Services Code Point Mirroring For Wireless Communications expedites the flow of IP traffic between a user's wireless terminal device and a server by eliminating the need for the terminal device to generate the Differentiated Services Code Point header to classify and prioritize information content for each IP packet that is transmitted to the network.

BACKGROUND OF THE INVENTION

It is a problem in the field of wireless communications to efficiently manage the IP traffic in a communication session between a user's terminal device and the server with which it is communicating. In existing systems, the user's terminal device and server typically generate a Differentiated Services Code Point header to classify and prioritize information contained in each IP packet that is transmitted to the network for delivery as part of the communication session. An exception to this process is in the case of wireless services provided by an aircraft-based network to passengers who are located in the aircraft as the aircraft roams among cell sites in the non-terrestrial cellular communication network. The onboard aircraft network serves a plurality of passengers, yet has a link to the ground-based network via a single wide bandwidth Air-To-Ground link that concurrently serves multiple individual passengers. Each passenger is connected via an individual channel on the Air-To-Ground link to the ground-based network to access the desired communication services and the servers which provide these services. There is presently no management of the various passenger traffic and classes of data on the Air-To-Ground link to optimize or guarantee performance, low latency, and/or bandwidth.

When wireless passengers enter the non-terrestrial cellular communication network (that is, they fly in an aircraft as passengers), they encounter a unique environment that traditionally has been disconnected from the terrestrial cellular network, which concurrently serves many subscribers via individually managed communication channels. In contrast, the wireless network of the aircraft interfaces the passenger to various services and content using a single shared link to the ground-based Access Network via a wide bandwidth radio frequency connection that has a single IP address on the ground-based Access Network. Each passenger is associated with an individual channel on the Air-To-Ground link to the ground-based network to access the desired communication services. The management of this wide bandwidth connection to enable the individual identification of passengers via the assignment of individual unique IP addresses to each passenger wireless device has yet to be addressed in existing Air-To-Ground wireless networks, and the dynamic management of the traffic load to ensure quality of service has yet to be addressed in existing systems.

BRIEF SUMMARY OF THE INVENTION

The above-described problems are solved and a technical advance achieved in the field by the present Differentiated Services Code Point Mirroring For Wireless Communications (termed "DSCP Mirroring System" herein), which enables the automatic reuse of the Differentiated Services Code Point header by the users' wireless terminal devices and the servers with whom they are communicating to enable delivery of wireless services to the individually identified user wireless terminal devices and manage the various data traffic and classes of data to optimize or guarantee performance, low latency, and/or bandwidth without the overhead of the management and generation of the Differentiated Services Code Point header for each IP packet exchanged. The network and/or terminal device can be located in a vehicle, such as an aircraft, ship, train, or the like, or within a building or any other locale which serves a plurality of users via a wireless Local Area Network. The wireless Local Area Network is used to access the Internet (or other data communication networks) via a communication link, which has a bandwidth that must be shared among the users. For the purpose of illustrating the concepts of the present DSCP Mirroring System, the aircraft paradigm is used, where a Local Area Network on the aircraft interconnects a plurality of passengers' wireless terminal devices to the ground-based Access Network via an Air-To-Ground communication link.

The electronic services that are provided to the passenger include Internet, in-flight entertainment services (such as multi-media presentations), as well as destination-based services which link the passenger's existing travel plans with offers for additional services that are available to the passenger at their nominal destination and their planned travel schedule, and optionally, voice services. The passenger thereby is presented with opportunities during their flight to enhance their travel experience, both in-flight and at their destination, by accessing the various services. The individual identification of each passenger wireless device simplifies the provision of these services and enables the customization of these services based upon predefined profiles created for the passenger. However, these various types of data require different types of management to ensure passenger satisfaction with the service.

The DSCP Mirroring System manages the various passenger traffic and classes of data to optimize or guarantee performance, low latency, and/or bandwidth in a simplified manner by mirroring the Differentiated Services Code Point header to ensure that the classification and prioritization information represented by the Differentiated Services Code Point header is identical in both the transmit and receive directions. Thus, each passenger's data is uniformly processed without incurring the overhead of calculating the appropriate Differentiated Services Code Point header and inserting this value in each of the outgoing and incoming transmissions. The level of service provided for a class of data, therefore, is commensurate with the nature of the data, the expectations of the passengers, and the capacity of the Air-To-Ground link, and is set by network servers off the aircraft which have the processing capability to compute the appropriate Differentiated Services Code Point header values without disrupting the communications between onboard passenger wireless terminal devices and the servers with which they are communicating. This is accomplished by the DSCP Mirroring System simply reading the Differentiated Services Code Point header in a received data transmission and mirroring this value in the response transmission, without analysis or qualification of this value.

DETAILED DESCRIPTION OF THE INVENTION

The DSCP Mirroring System operates to expedite the processing of traffic on a shared broadband communication link which interconnects a Local Area Network with one or more data communications networks to control the traffic provided to each of the wireless terminal devices connected to the Local Area Network. The Local Area Network and/or terminal devices can be located in a vehicle, such as an aircraft, ship, train, or the like, or within a building or any other locale which serves a plurality of users via a wireless Local Area Network. The wireless Local Area Network is used to access the Internet (or other data communication networks) via a communication link, which has a bandwidth that must be shared among the wireless terminal devices. For the purpose of illustrating the concepts of the present DSCP Mirroring System, the aircraft paradigm is used, where a Local Area Network on the aircraft interconnects a plurality of passengers' wireless terminal devices to the ground-based Access Network via an Air-To-Ground communication link and thence to servers which are connected to the Internet or other data communication networks.

Overall System Architecture

Figure 1:
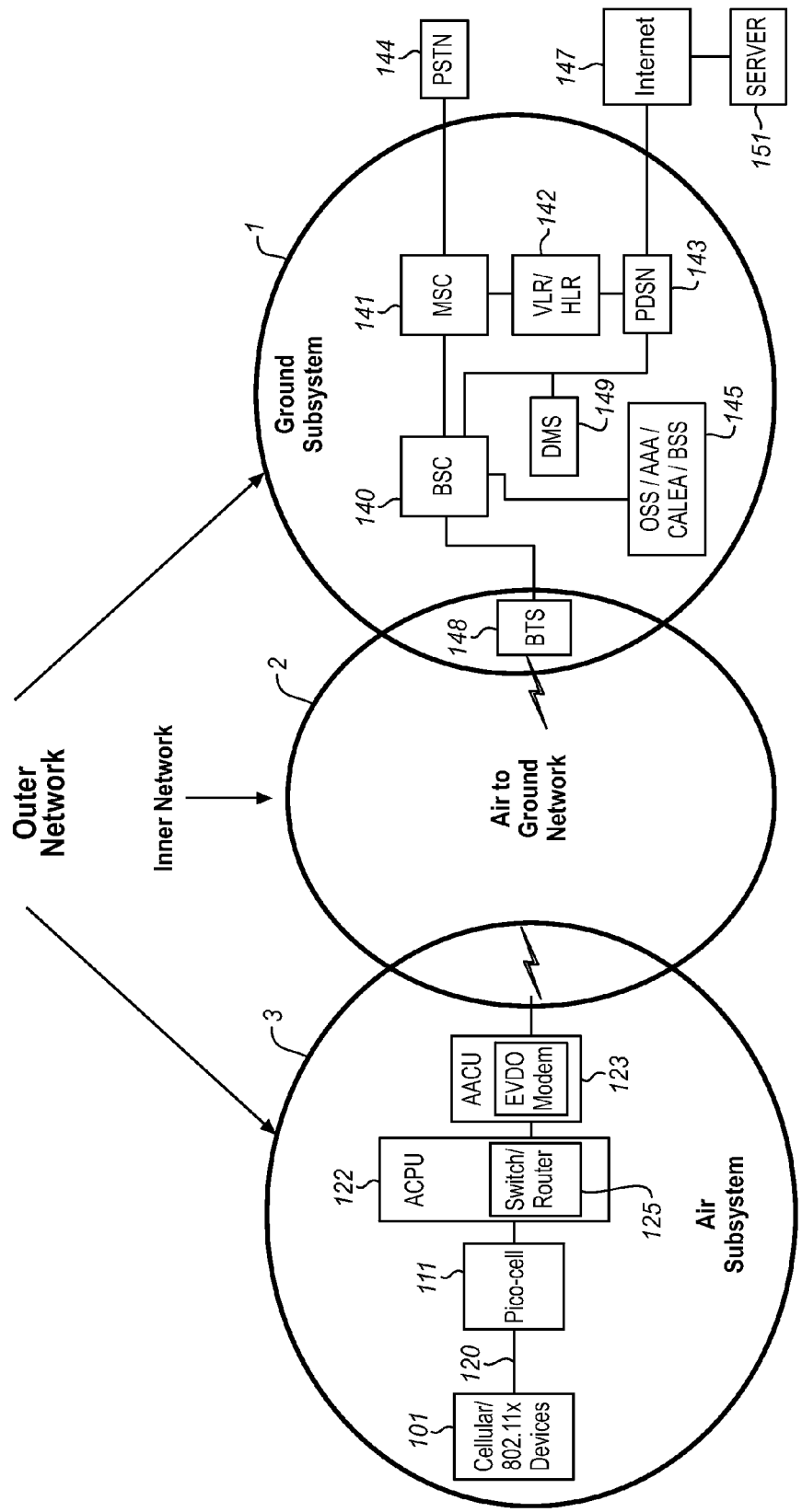
FIG. 1 illustrates, in block diagram form, the overall architecture of a communications environment consisting of a composite Air-To-Ground network that interconnects an Air Subsystem with a Ground-Based Access Network.

FIG. 1 illustrates, in block diagram form, the overall architecture of a typical networked data communications environment which is subject to bandwidth intensive communications, consisting of a non-terrestrial communication network, which includes an Air-To-Ground Network 2 (Inner Network) that interconnects the two elements of an Outer Network, comprising an Air Subsystem 3 and Ground Subsystem 1. This diagram illustrates the basic concepts of the non-terrestrial communication network and, for the purpose of simplicity of illustration, does not comprise all of the elements found in a typical non-terrestrial communication network. The fundamental elements disclosed in FIG. 1 provide a teaching of the interrelationship of the various elements which are used to implement a non-terrestrial communication network to provide content to passenger wireless terminal devices which are located in an aircraft. This is accomplished by the Air-To-Ground Network 2 transmitting both the passenger communication traffic (comprising voice and/or other data) and control information between the Air Subsystem 3 and the Ground Subsystem 1 thereby to enable the passenger wireless terminal devices that are located in the aircraft to receive communication services in the aircraft.

Air Subsystem

The "Air Subsystem" is the communications environment that is implemented in the aircraft; and these communications can be based on various technologies, including but not limited to: wired, wireless, optical, acoustic (ultrasonic), and the like. An example of such a network is disclosed in U.S. Pat. No. 6,788,935, titled "Aircraft-Based Network For Wireless Subscriber Stations".

The disclosed embodiment for the Air Subsystem 3 is the use of wireless technology and for the wireless technology to be native to passenger wireless devices that passengers and crew carry on the aircraft. Thus, a laptop computer can communicate via a WiFi or WiMax wireless mode (or via a wired connection, such as a LAN). Optionally, voice service can be provided where a PDA could communicate telephony voice traffic via VoIP (Voice over IP). Likewise, a handheld cell phone that uses the GSM protocol communicates via GSM, and a CDMA cell phone would use CDMA when inside the aircraft to connect to the Air Subsystem 3. The connection states could be packet-switched or circuit-switched or both. Overall, the objective on the Air Subsystem 3 is to enable seamless and ubiquitous access to the Air Subsystem 3 for passenger wireless devices that are carried by passengers and crew, regardless of the technology used by these passenger wireless devices.

The Air Subsystem 3 also provides the mechanism to manage the provision of services to the passenger wireless devices that are operating in the aircraft cabin. This management includes not only providing the passenger traffic connectivity but also the availability of non-terrestrial specific feature sets which each passenger is authorized to receive. These features include in-flight entertainment services, such as multi-media presentations, as well as destination-based services which link the passenger's existing travel plans with offers for additional services that are available to the passenger at their nominal destination and their planned travel schedule. The passenger thereby is presented with opportunities during their flight to enhance their travel experience, both in-flight and at their destination.

The passenger wireless terminal devices 101 used in the aircraft can be identical to those used on the cellular/PCS ground-based communication network; however, these passenger wireless terminal devices 101 are pre-registered with the carrier serving the aircraft and/or users have PIN numbers for authentication. In addition, an antenna interconnects the passenger wireless terminal devices 101 with the one or more in-cabin Base Transceiver Stations (BTS) 111, which are typically pico-cells with BSC/MSC functions integrated. BTS/BSC/MSC modules can be added for each air-interface technology supported. The Airborne Control Processor Unit (ACPU) 122 and Air-To-Ground Airborne Communications Unit (AACU) 123, including a Modem, act as the bridging function (for media/content and signaling to a limited extent) between the Air Subsystem 3 and the ground-based Access Network 1, since the Airborne Control Processor Unit (ACPU) 122 places a call using the Modem to the ground-based Access Network 1 via the Air-To-Ground Network 2. Airborne Control Processor Unit (ACPU) 122 converts the individual traffic and signaling channels from the base stations to/from an aggregate data stream, and transmits/receives the aggregate data streams over the Air-To-Ground Network 2 which maintains continuous service as the aircraft travels. The Modem includes radio transmission equipment and antenna systems to communicate with ground-based transceivers in the ground-based portion of the Air-To-Ground Network 2. The individual traffic channels assigned on the Air-To-Ground Network 2 are activated based upon the traffic demand to be supported from the aircraft.

Air-to-Ground Network

The Air-To-Ground Network 2 shown in FIG. 1 is clearly one that is based on wireless communications (radio frequency or optical) between the Ground Subsystem 1 and the Air Subsystem 3 which serves the passenger wireless terminal devices that are located in the aircraft, with the preferred approach being that of a radio frequency connection. This radio frequency connection typically takes on the form of a cellular topology where typically more than one cell describes the geographic footprint or coverage area of the composite Air-To-Ground Network 2. The Air-To Ground connection carries both passenger communications traffic and native network signaling traffic. The Air-To-Ground Network 2 transports all traffic to/from the aircraft in one or more aggregated communication channels. This "composite pipe" has distinct advantages in terms of managing hard and soft handoffs as the aircraft transitions between one ground-based cell to the next. The one or more aggregated communication channels can be transported via multiple Air-To-Ground Links, each transporting an aggregated communication channel; and these multiple Air-To-Ground Links can implement different technologies and/or capacities.

Furthermore, the Air-To-Ground Network 2 could be achieved through a wireless satellite connection where radio frequency links are established between the aircraft and a satellite and between the satellite and the Ground Subsystem 1, respectively. These satellites could be geosynchronous (appears to be stationary from an earth reference point) or moving, as is the case for Medium Earth Orbit (MEO) and Low Earth Orbit (LEO). Examples of satellites include but are not limited to: Geosynchronous Ku Band satellites, DBS satellites (Direct Broadcast Satellite), the Iridium system, the Globalstar system, and the Inmarsat system. In the case of specialized satellites, such as those used for Direct Broadcast Satellite, the link typically is unidirectional, that is, from the satellite to the receiving platform, in this case an aircraft. In such a system, a link transmitting unidirectionally from the aircraft is needed to make the communication bidirectional. This link could be satellite or ground-based wireless in nature as previously described. Lastly, other means for communicating with an aircraft include broad or wide area links such as High Frequency (HF) radio and more unique systems such as troposcatter architectures.

The Air-To-Ground Network 2 can be viewed as the conduit through which the passenger communications traffic, as well as the control and network feature set data, is transported between the Ground Subsystem 1 and the Air Subsystem 3. The Air-To-Ground Network 2 can be implemented as a single radio frequency link or multiple radio frequency links, with a portion of the signals being routed over different types of links, such as the Air-To-Ground Link and the Satellite Link. Thus, there is a significant amount of flexibility in the implementation of this system using the various components and architectural concepts disclosed herein in various combinations.

Ground Subsystem

The Ground Subsystem 1 typically consists of Base Station Controller 140 which connects the voice traffic of the Air-To-Ground Network 2 with traditional cellular communication network elements, including a Mobile Switching Center 141 and its associated Visited Location Register, Home Location Register 142, to interconnect the voice traffic (if provisioned) to the Public Switched Telephone Network 144. In addition, the Base Station Controller 140 is connected to the Internet 147 via Serving GPRS Support Node (SGSN) and its associated Gateway GPRS Support Node (GGSN) 143 (or other equivalent elements) for completion of data communication sessions. For 3G CDMA2000 applications, this element is a Packet Data Serving Node, or PDSN, and acts as the connection point between the Radio Access and IP networks. This component is responsible for managing PPP sessions between the mobile provider's core IP network and the mobile station (read mobile phone). It is similar in function to the GGSN (GPRS Gateway Support Node) that is found in GSM and UMTS networks. Although PDSN is thought of being similar to GGSN in a conceptual sense, logically it is a combination of SGSN and GGSN in the CDMA world. It provides mobility management functions (provided by SGSN in the GPRS/UMTS networks) and packet routing functionality (provided by GGSN in the GPRS/UMTS networks). For simplicity's sake, this element is referred to as the Packet Data Serving Node (PDSN) 143 herein. Base Station Controller 140 also provides interconnection of the VoIP traffic to the Internet 147. Other functionalities in the Ground Subsystem 1 include the Authentication Server, Operating Subsystems, CALEA, and BSS servers 145.

Thus, the communications between the passenger wireless terminal devices 101 located in an aircraft and the Ground Subsystem 1 of the ground-based communication network are transported via the Air Subsystem 3 and the Air-To-Ground Network 2 to the ground-based Base Station Controller 140 of the non-terrestrial cellular communication network. The enhanced functionality described below and provided by the Air Subsystem 3, the Air-To-Ground Network 2, and the ground-based Base Station Controller 140 renders the provision of services to the passenger wireless terminal devices 101 located in an aircraft transparent to the passengers. The Radio Access Network (RAN) supports communications from multiple aircraft and may employ a single omni-directional signal, or may employ multiple spatial sectors which may be defined in terms of azimuth and/or elevation angles. Aircraft networks hand over the Point-to-Point communication links between Radio Access Networks (RAN) in different locations (different Ground Subsystems 1) in order to maintain continuity of service on Air-To-Ground Network 2. Handovers may be hard or soft, or may be a combination of hard and soft on the Air-To-Ground and Ground-To-Air links.

The Mobile Switching Center 141 provides mobility management for all airborne systems and provides handover management between ground stations as an airborne system moves between the service areas of adjoining Ground Subsystems 1. The Base Station Controller 140 interfaces all traffic to/from the associated Base Transceiver Subsystem (BTS) 148. The Packet Data Serving Node (PDSN) controls assignment of capacity of each of the Base Transceiver Subsystems 148 among the airborne systems within their respective service areas.

Passenger Login for System Access

On each aircraft, the passenger access to electronic communications typically is regulated via a passenger wireless device registration process, where each electronic device must be identified, authenticated, and authorized to receive service. Since the aircraft is a self-contained environment with respect to the wireless communications between the passenger wireless devices and the airborne wireless network extant in the aircraft, all communications are regulated by the network controller. Thus, when a passenger activates their passenger wireless device, a communication session is initiated between the passenger wireless device and the network controller to identify the type of device the passenger is using and, thus, its wireless protocol. A "splash screen" is delivered to the passenger on the passenger wireless device to announce entry into the wireless network portal. Once this is established, the network controller transmits a set of login displays to the passenger wireless device to enable the passenger to identify themselves and validate their identity (if the passenger wireless device is not equipped to automatically perform these tasks via a smart client which automatically logs the passenger into the network). As a result of this process, the passenger wireless device is provided with a unique electronic identification (IP address), and the network can respond to the passenger wireless device without further administrative overhead. The authentication process may include the use of security processes, such as a password, scan of a passenger immutable characteristic (fingerprint, retina scan, etc.), and the like.

Once the passenger wireless device is logged in, the passenger can access the free standard electronic services that are available from the network or customized electronic services for the particular passenger. The screens that are presented to the passenger can be customized to present the branding of the airline on which the passenger is traveling.

Individual IP Addresses for Passenger Wireless Terminal Devices Onboard an Aircraft For forward traffic from the ground-based Access Network to a passenger wireless terminal device on the aircraft, the Packet Data Serving Node (PDSN) 143 maps a packet's destination IP address to an Air-To-Ground Modem 123 that is located onboard the aircraft. However, the standard Packet Data Serving Node (PDSN) 143 only supports a handful of IP addresses per Air-To-Ground Modem 123; and there are not enough IP addresses to be able to assign one per passenger wireless device located onboard the aircraft. The Network Address Translation (NAT) onboard the aircraft allows the Packet Data Serving Node (PDSN) 143 to route data communications to multiple users using a single address for the aircraft; but in doing so, the Network Address Translation (NAT) hides the user addresses from the serving Packet Data Serving Node (PDSN) 143 as well as the Network Operations Center (NOC) (not shown) which is located on the ground. This makes the following functions difficult/impossible to implement in the Access Network:

1. Per-user, bandwidth shaping (e.g., limit P2P traffic).
2. Per-user, forward access control.
3. Transmission Control Protocol (TCP) optimization.

Therefore, the Access Network needs to be able to differentiate data streams that are received from and transmitted via the Air-To-Ground Modem(s) 123 to the individual passenger wireless devices which are located onboard the aircraft. The way to do this is by making the user IP addresses visible on the ground to the Access Network, which implies that the IP addresses assigned to passenger wireless devices should be globally unique within the Airborne Wireless Cellular Network. To accomplish this, the Aircraft ID can be made part of a "subnet" for the IP address assigned via aircraft Dynamic Host Configuration Protocol (DHCP), which is a protocol used by networked devices (clients) to obtain various parameters necessary for the clients to operate in an Internet Protocol (IP) network. By using this protocol, system administration workload greatly decreases; and devices can be added to the network with minimal or no manual configurations. This makes it easier for the Network Operations Center (NOC) to map a user's IP address to an aircraft.

When a Dynamic Host Configuration Protocol (DHCP)-configured client (such as the aircraft-based Air-To-Ground Modem 123) connects to a network, its Dynamic Host Configuration Protocol (DHCP) client sends a broadcast query requesting necessary information from the serving Dynamic Host Configuration Protocol (DHCP) server. The Dynamic Host Configuration Protocol (DHCP) server manages a pool of IP addresses and information about client configuration parameters such as the default gateway, the domain name, the DNS servers, other servers such as time servers, and so forth. Dynamic Host Configuration Protocol (DHCP) provides a mechanism for allocating IP addresses wherein the Network Operations Center (NOC) assigns a range of IP addresses to the aircraft-based Dynamic Host Configuration Protocol (DHCP) server. The request-and-grant process of this protocol uses a lease concept with a controllable time period, allowing the Dynamic Host Configuration Protocol (DHCP) server to reclaim (and then reallocate) IP addresses that are not renewed (dynamic re-use of IP addresses).

Network Address Translation IP Tunnel Example

Figure 2:
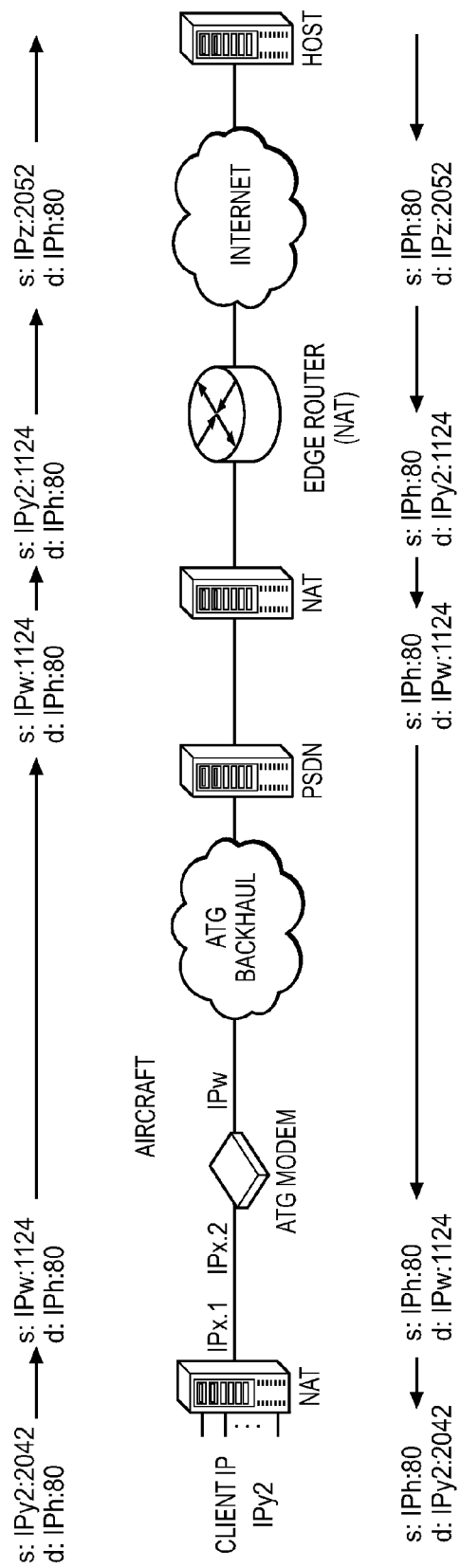
FIGS. 2 and 3 illustrate in signal flow diagram form and in flow diagram form, respectively, the typical operation of the DSCP Mirroring System using an IP Tunnel.
Figure 3:
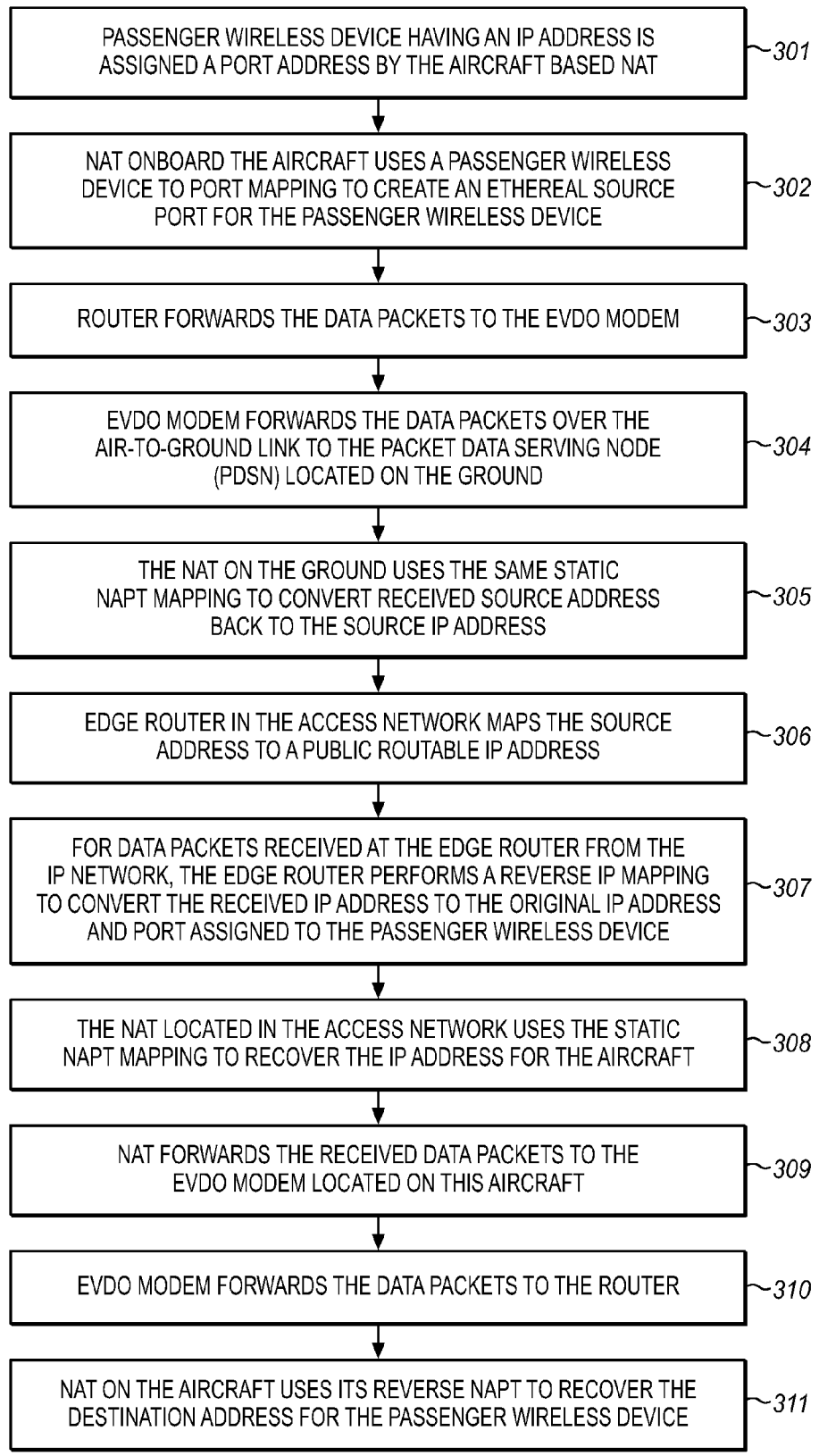

FIG. 2 illustrates, in signal flow diagram form, and FIG. 3 illustrates, in flow diagram form, the typical operation of the DSCP Mirroring System using a NAT IP Tunnel to exchange data with a specific destination. This example illustrates a selected passenger wireless device having an IP address of IPy.2 communicating with an end point (not shown) that has an IP address of IPh:80. The passenger wireless device is assigned a port address, such as 2042, at step 301 by the NAT located onboard the aircraft, which port address is appended to the passenger wireless device IP address to yield IPy2: 2042, which is a private, globally unique, dynamic IP address for this passenger wireless device located in the particular aircraft (w). The NAT onboard the aircraft at step 302, therefore, uses this passenger wireless device to port mapping to create an ethereal source port for the passenger wireless device IP address IPy.2. The source address, therefore, is IPy2:2042 and the destination address is IPh:80.

The Router is assigned an IP address of IPx.1, and the Air-To-Ground Modem is assigned an IP address of IPx.2, where these IPx.* addresses are private, locally unique, static IP addresses. The Air-To-Ground Modem is the NAT Tunnel endpoint on the aircraft, identified by an IPw.* IP address, and the IPw.* IP addresses are private, globally unique, static IP addresses assigned by the Packet Data Serving Node (PDSN). For data packet traffic generated by the passenger wireless devices, the NAT on the aircraft uses a static NAPT to map the passenger wireless device IPy.z.* IP address to an IPw.x IP address and an ethereal source port (from a range of ports assigned to that aircraft) that is unique for the particular passenger wireless device IPy.z.* Thus, the Router selects an IP address assigned by the Packet Data Serving Node (PDSN) and assigns an IP address of IPw:1124 to this source passenger wireless device.

The data packet then is tunneled to the Air-To-Ground Modem by the Router at step 303 over the IPx.* network, and then is forwarded at step 304 by the Air-To-Ground Modem over the Air-To-Ground link to the Packet Data Serving Node (PDSN) located on the ground. The Packet Data Serving Node (PDSN) sees only a single IP address per aircraft as is expected, and the NAT on the ground uses the same static NAPT mapping at step 305 to convert IPw.x and source port from the aircraft back to the IPy IP address. The ethereal source port received from the aircraft remains the same. Thus, at the NAT, the source address for the passenger wireless device becomes IPy2:1124, since the source port address does not change. The Edge Router in the Access Network maps the source address to a public routable IP address IPz: 2052 at step 306 and selects any available ethereal source port.

In the reverse direction, data packets received at the Edge Router from the IP Network from the destination (now termed source IPh:80 in this direction of the bidirectional communication connection) are directed at step 307 to destination IPz:2052, and the Edge Router performs a reverse IP mapping to convert the received IP address to the original IP address and port assigned to the passenger wireless device to yield IPy2:1124. The NAT located in the Access Network uses the static NAPT mapping at step 308 to recover the IPw for the aircraft in which this passenger wireless device resides. The destination port remains the same and, therefore, the IP address output by the NAT is IPw:1124. The NAT located in the Access Network at step 309 forwards the received data packets to the Air-To-Ground Modem located onboard this aircraft. The received data packets are received at the Air-To-Ground Modem located on this aircraft and are forwarded at step 310 to the Router, where the NAT on the aircraft at step 311 uses its reverse NAPT to recover the destination address IPy2 and port 2042 for the passenger wireless device.

In this manner, the address manipulation used in the aircraft and in the Access Network enables the Packet Data Serving Node (PDSN) 143 to present unique IP addresses to the ground-based network for the plurality of passenger wireless devices located on the aircraft, yet use the standard common IP address for the Air-To-Ground link.2.

Signaling Details of Point-to-Point Protocol Session Establishment

Figure 4:
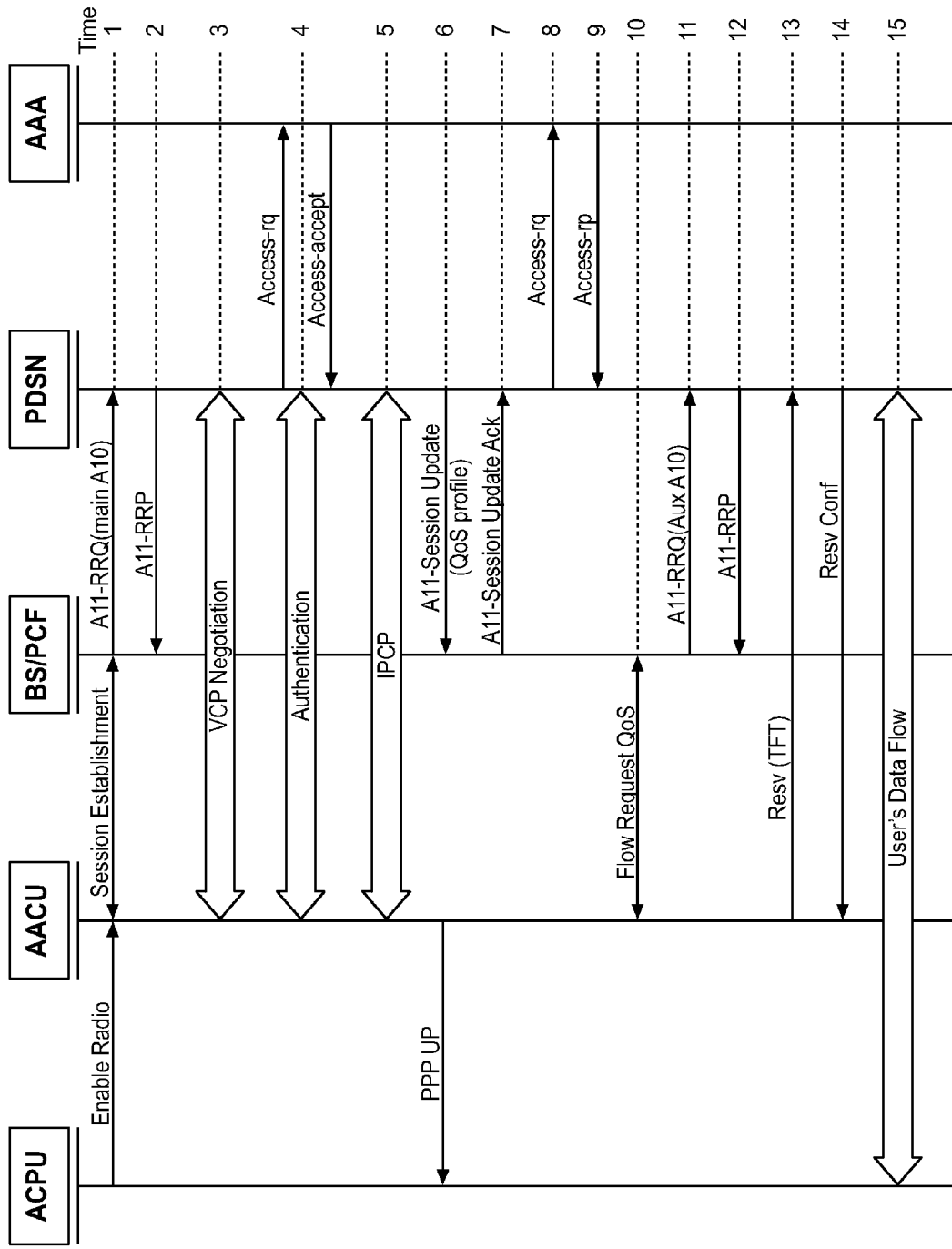
FIG. 4 illustrates the signal flow in a typical Point-To-Point Protocol Session Establishment process.

FIG. 4 illustrates the signal flow in a typical Point-To-Point Protocol Session Establishment process which is executed between the aircraft and the ground-based communication system over the Air-To-Ground link 2, and FIG. 5 illustrates the signal flow in a typical Forward Flow of an established connection over the Air-To-Ground link 2. The following signal flows are shown in FIG. 4:

1. The Airborne Control Processor Unit (ACPU) 122 notifies the Air-To-Ground Airborne Communications Unit (AACU) 123 to enable its radio frequency transceiver to establish a data connection.
2. The Air-To-Ground Airborne Communications Unit (AACU) 123 establishes a session with Base Station Controller 140, and the Packet Control Function contained therein initiates A11 registration request to Packet Data Serving Node 143 to establish the main A10 tunnel for this aircraft.
3. Packet Data Serving Node 143 establishes the main A10 tunnel by returning an A11-Registration Reply message to the Base Station Controller 140 with an accept indication and Lifetime set to a non-zero value.
4. The Air-To-Ground Airborne Communications Unit (AACU) 123 initiates LCP negotiation with Packet Data Serving Node 143.
5. The Air-To-Ground Airborne Communications Unit (AACU) 123 is authenticated by Authentication, Authorization, and Accounting (AAA) server 145. Authorization information of the Airborne Terminal is stored by Packet Data Serving Node 143.
6. Packet Data Serving Node 143 assigns the first IP address of a pre-specified IP Network to the Air-To-Ground Airborne Communications Unit (AACU) 123 in Internet Protocol Control Protocol (IPCP):
   a) For example, the IP address subnet is based on the Air-To-Ground Airborne Communications Unit (AACU) 123 Network Address Identifier (NAI), e.g. the Air-To-Ground Airborne Communications Unit 123 receives IP address 192.168.1.1 from Sub-network 192.168.1.0/24.
   b) The Sub-network size (/24, /23, etc.) and Network Address Identifier Sub-network mapping is defined on the Air-To-Ground Airborne Communications Unit (AACU) 123 and Packet Data Serving Node 143 prior to first call; thus, the IP Sub-network assignment is "Implicitly Assigned".
   c) There is no change in Internet Protocol Control Protocol (IPCP) messaging or structure.
   d) The Air-To-Ground Airborne Communications Unit (AACU) 123 can utilize the Sub-network pool of addresses in any way; the Packet Data Serving Node 143 Point-to-Point Protocol/Queue forwarding logic (Forward Link) must allow for the Sub-network of addresses to be associated with the single Point-to-Point Protocol link (negotiation).
7. After the Air-To-Ground Airborne Communications Unit (AACU) 123 finishes establishing Point-to-Point Protocol session, the Air-To-Ground Airborne Communications Unit (AACU) 123 notifies Airborne Control Processor Unit (ACPU) 122. At the same time, Packet Data Serving Node 143 sends A11 session update to Packet Control Function for notifying the user's QoS profile to Base Station Controller 140.
8. Base Station Controller 140 sends acknowledgement to Packet Data Serving Node 143.
9. Upon establishment of the Point-to-Point Protocol session, Packet Data Serving Node 143 sends accounting request to Authentication, Authorization, and Accounting (AAA) server 145.
10. Authentication, Authorization, and Accounting (AAA) server 145 stores user's accounting packets and sends accounting replies to Packet Data Serving Node 143.
11. Air-To-Ground Airborne Communications Unit (AACU) 123 sends QoS request message to Base Station Controller 140. Base Station Controller 140 reserves QoS resource for Air-To-Ground Airborne Communications Unit (AACU) 123.
12. Packet Control Function sends A11 registration request to Packet Data Serving Node 143 to establish auxiliary A10 tunnel.
13. Packet Data Serving Node 143 establishes auxiliary A10 tunnel.
14. Air-To-Ground Airborne Communications Unit (AACU) 123 sends RESV message to Packet Data Serving Node 143 to provide the Packet Data Serving Node 143 with Queue for the data flow of users.
15. Packet Data Serving Node 143 stores Packet Filters of Queue and replies to Air-To-Ground Airborne Communications Unit (AACU) 123.
16. User begins to transmit data flow.

Forward and Reverse Flows

Figure 5A:
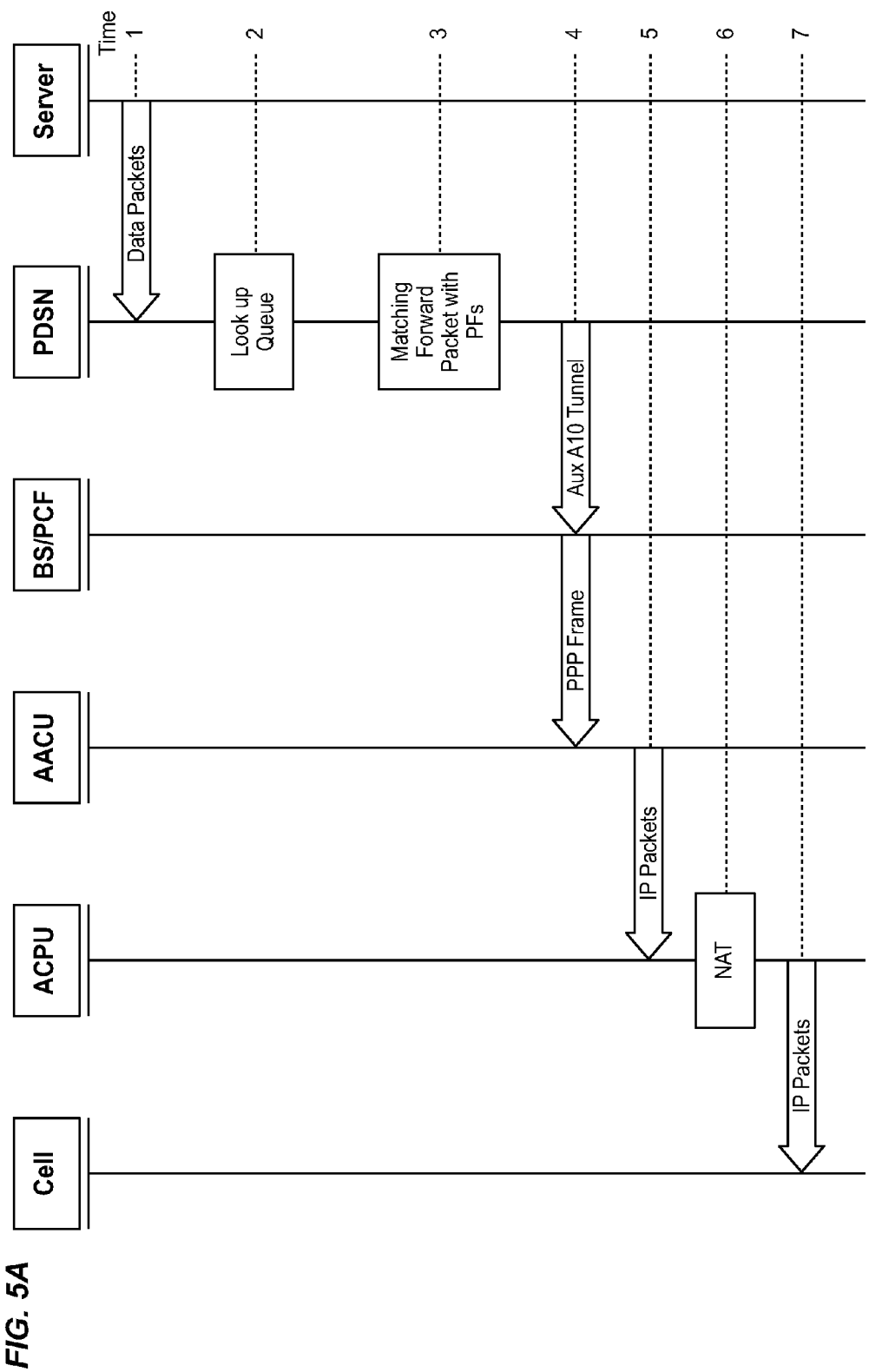
FIGS. 5A and 5B illustrate the signal flow in a typical Forward Flow and a Reverse Flow, respectively, of an established connection.
Figure 5B:
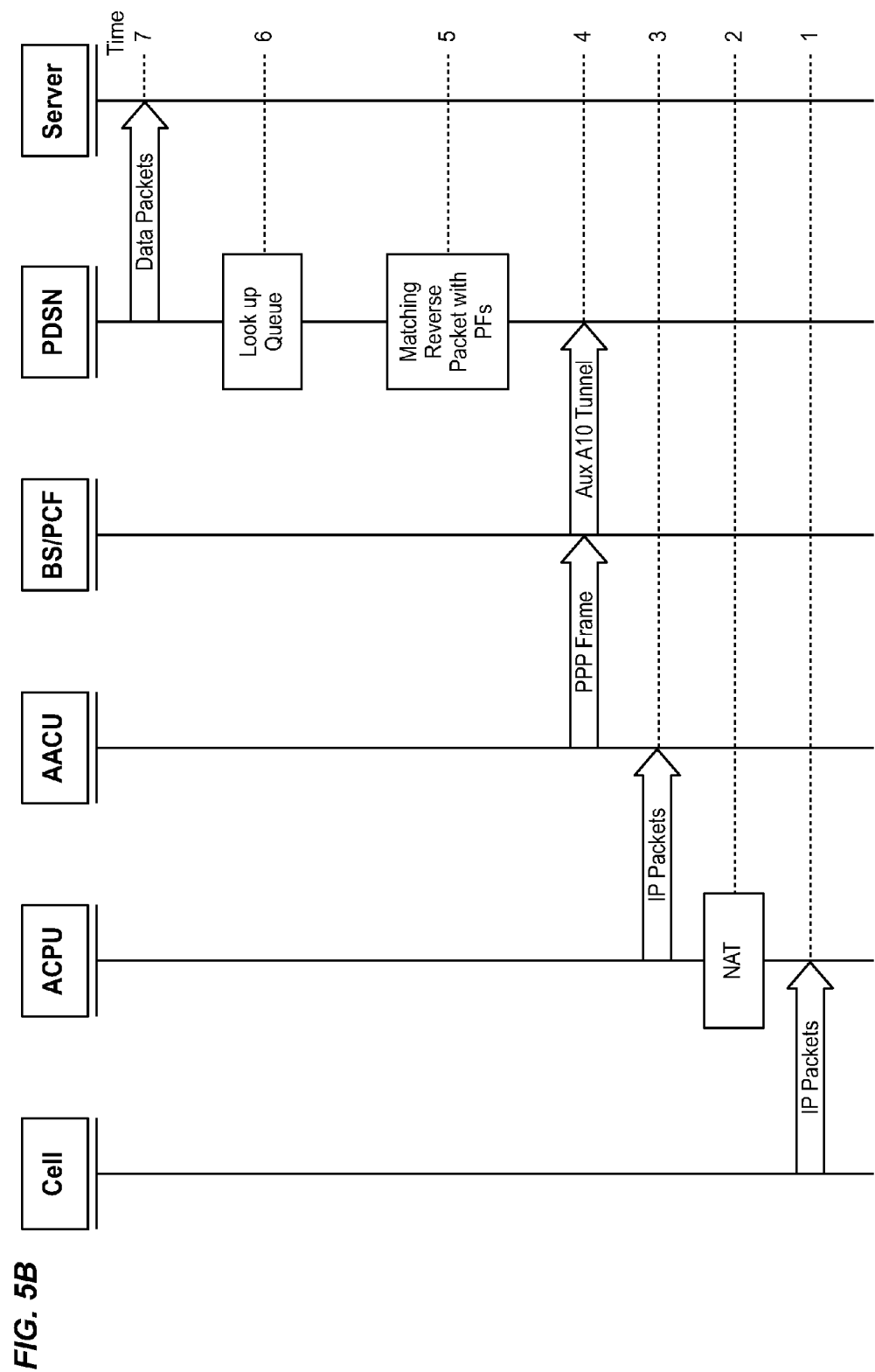

FIGS. 5A and 5B illustrate the signal flow in typical Forward Flow and Reverse Flow, respectively, of an established connection over the Air-To-Ground link, as follows:

For Forward Flow in FIG. 5A:

1. The Server 151 sends data packets to the Packet Data Serving Node 143.
2. Packet Data Serving Node 143 retrieves the Queue associated with the user's terminal device 101 according to the destination IP address of the data packet (server 151). The Destination IP address is a single address within the IP Pool (Subnet) assigned to that Point-to-Point Protocol link.
3. The Packet Data Serving Node 143 applies a Packet Filter (PF) which is defined in the Queue to match the ToS in the IP header of the packet received from the user's terminal device 101. The Packet Filter includes Differentiated Services Code Point (DSCP) values as filter components.
4. Once the Packet Data Serving Node 143 matches the packets successfully, the Packet Data Serving Node 143 reads the Flow ID from the matched Packet Filter and finds the appropriate A10 tunnel bearing the Flow ID. The Packet Data Serving Node 143 then encapsulates the received data into the specified A10 tunnels. Packet Data Serving Node 143 sends the packets to Base Station Subsystem/PCF, and Base Station Subsystem/PCF sends the received data to Air-To-Ground Airborne Communications Unit (AACU) 123 by wireless interface.

5. When Air-To-Ground Airborne Communications Unit (AACU) 123 receives a Point-to-Point Protocol frame, Air-To-Ground Airborne Communications Unit (AACU) 123 decapsulates the Point-to-Point Protocol frame to get the user's IP packets and sends the packets of data to Airborne Control Processor Unit (ACPU) 122.
6. Airborne Control Processor Unit (ACPU) 122 makes the Network Address Translation for the IP header of the packets of the user's wireless terminal device 101.
7. After Network Address Translation, Airborne Control Processor Unit (ACPU) 122 sends the received and translated packets to the wireless cell 111 for delivery to the use's wireless terminal device 101.

For Forward Flow in FIG. 5B:
1. User's wireless terminal device reuses received DCSP header in generating a new IP packet which is delivered to the cell 111 for transmission to server 151.
2. Cell 111 transmits the received IP packet to the Airborne Control Processor Unit (ACPU) 122 which makes the Network Address Translation for the IP header of the IP packets received from the user's wireless terminal device 101.
3. Airborne Control Processor Unit (ACPU) 122 encapsulates the IP packets received from the user's wireless terminal device 101 into a Point-to-Point Protocol frame.
4. Air-To-Ground Airborne Communications Unit (AACU) 123 sends the packets to Base Station Subsystem/PCF in the DCSP specified A10 tunnels.
5. The Packet Data Serving Node 143 then decapsulates the user's data from the specified A10 tunnel and retrieves the Queue associated with the user's terminal device 101 according to the destination IP address of the data packet (server 151).
6. The Packet Data Serving Node 143 applies a Packet Filter (PF) which is defined in the Queue to match the ToS in the IP header of the packet received from the user's terminal device 101. The Packet Filter includes Differentiated Services Code Point (DSCP) values as filter components.
7. The Packet Data Serving Node 143 transmits the user's IP packets to the server 151, using the DCSP header that was reused by the user wireless terminal device 101.

Differentiated Services Code Point

The Differentiated Services Code Point (DSCP) is a 6-bit field located in the header of IP packets for packet classification purposes. DSCP replaces the outdated IP precedence, a 3-bit field in the Type of Service byte of the IP header originally used to classify and prioritize types of traffic. Packets are classified and marked to receive a particular per-hop forwarding behavior on nodes along their path. Sophisticated classification, marking, policing, and shaping operations are implemented at network boundaries or in hosts (such as in Router 125); and these operations typically consume considerable processing resources in high traffic situations. Network resources are allocated to traffic streams by service provisioning policies which govern how traffic is marked and conditioned upon entry to a differentiated services-capable network and how that traffic is forwarded within that network. A wide variety of services can be implemented on top of these building blocks.

Users have an increasing need to dynamically prioritize the individual traffic flows of application sessions traversing IP- (Internet Protocol) based networks, such as enterprise networks and VPN-type services provided by Internet Service Providers. An application session, for the purposes of this discussion, is a connection between any given instance of a client application and a server application, wherein the session comprises one or more individual traffic flows. The need to prioritize traffic flows exists because networks are carrying increasingly diverse traffic types that all compete for network resources. When a given traffic flow has particular bandwidth, latency, and/or packet loss requirements (particular Quality of Service (QoS) needs), other network traffic can consume network resources and thereby adversely affect the flow. Network administrators typically use DiffServ- (differentiated services) enabled networks to allocate network resources to critical applications so that the performance needs of these application sessions are met.

Specifically, a DiffServ-enabled network allows heterogeneous traffic types from different application sessions to co-exist while at the same time allocating these varying traffic types different network resources based on the needs of the application. As indicated, some traffic types have bandwidth, latency, and/or packet loss requirements that the total mix of traffic on a network can adversely affect. DiffServ allows a network administrator to establish traffic classes in the network by allocating network resources to each class. In general, traffic classes are established by configuring the network routers to support varying packet queuing and forwarding techniques, thereby providing different throughput, latency, and loss services for each class. Application sessions then are assigned to these classes and thereby are generally able to receive a certain quality of service.

Traffic classes are not specific to any given user, application, or session. Rather, any given traffic class typically carries data packets from many different applications originating from many different users. In particular, edge routers of the network assign packets from application sessions to traffic classes. The edge routers analyze each packet as it enters the network, classifying the packet according to an assigned traffic class, and insert a specific Differentiated Services Code Point (DSCP) value in the DSCP field of the packet header based on the assigned traffic class. The network routers use a packet's DSCP value to process the packet according to the assigned traffic class. The edge routers also typically condition the traffic before forwarding it into the network. Traffic conditioning includes packet shaping, dropping, and policing. Policing ensures that any given application session does not utilize more bandwidth than associated with the assigned service. Importantly, for edge router performance reasons, the edge routers assign traffic flows to traffic classes on an application and site basis. In other words, all traffic flows from a given application session from a set of designated sites are assigned to the same traffic class.

Although the traditional approaches to DiffServ can provide critical applications with the required resources to meet the application needs, these approaches have several drawbacks. In particular, there are an increasing number of application sessions that users want to prioritize. At the same time, however, very often only a particular traffic flow from a given session requires prioritization. Similarly, users often want to dynamically decide when a given application session receives prioritized service and when it does not. However, typical DiffServ approaches are not sufficiently scalable and dynamically configurable to meet the increasing number of applications sessions and individual user needs. Another issue is that DiffServ approaches are often susceptible to unpredictable traffic loads.

The network resources are limited, and edge routers should not over admit application sessions/users to the traffic classes. However, not all admitted users simultaneously run application sessions, and routers can under-utilize the network resources. Similarly, it is usually only a given traffic flow within a given session that actually requires the services, causing traffic classes to often carry unnecessary data packets. Accordingly, network resources should be allocated on a per traffic flow basis and when specifically needed. However, such a system is time consuming; and such continuous/dynamic assignment of traffic flows to traffic classes is not scalable, which is further described below. Similar issues exist in network environments where IP addresses are dynamically assigned through DHCP (Dynamic Host Configuration Protocol) and, therefore, dynamically change. In this environment, the edge routers must continuously reconfigure as IP addresses are re-assigned to network users or are forced to assign applications to traffic classes at a more coarse level, disregarding the individual sites. Again, quality of service is more appropriately designated on a per user/application session level.

DiffServ is not scalable since, as more users are added to a network and/or as administrators increase the number of applications requesting traffic class services, the edge routers correspondingly must perform additional packet filtering/marking/conditioning/policing responsibilities. At some point, the functional ability of the edge routers is reached, thereby causing a need for additional edge routers at additional cost. Similarly, as the edge routers are configured to admit more application sessions, the internal network resources must also be increased. However, as described above, the number of application sessions simultaneously needing the network resources is usually less than the number the edge routers are configured to admit, thereby causing network administrators to over provision the network.

Similarly, as described above, quality of service is more appropriately designated on a dynamic user basis at the traffic flow level. Again, edge router performance issues occur if routers are made to mark and condition at the traffic flow level, especially as users and applications are added to the network. In addition, continuously configuring and reconfiguring edge routers on a per user basis compromises edge router performance. Accordingly, it is desirable to dynamically provision QoS services on an individual traffic flow basis in a manner that does not impact the network performance.

Existing DSCP Marking Processes

Figure 6:
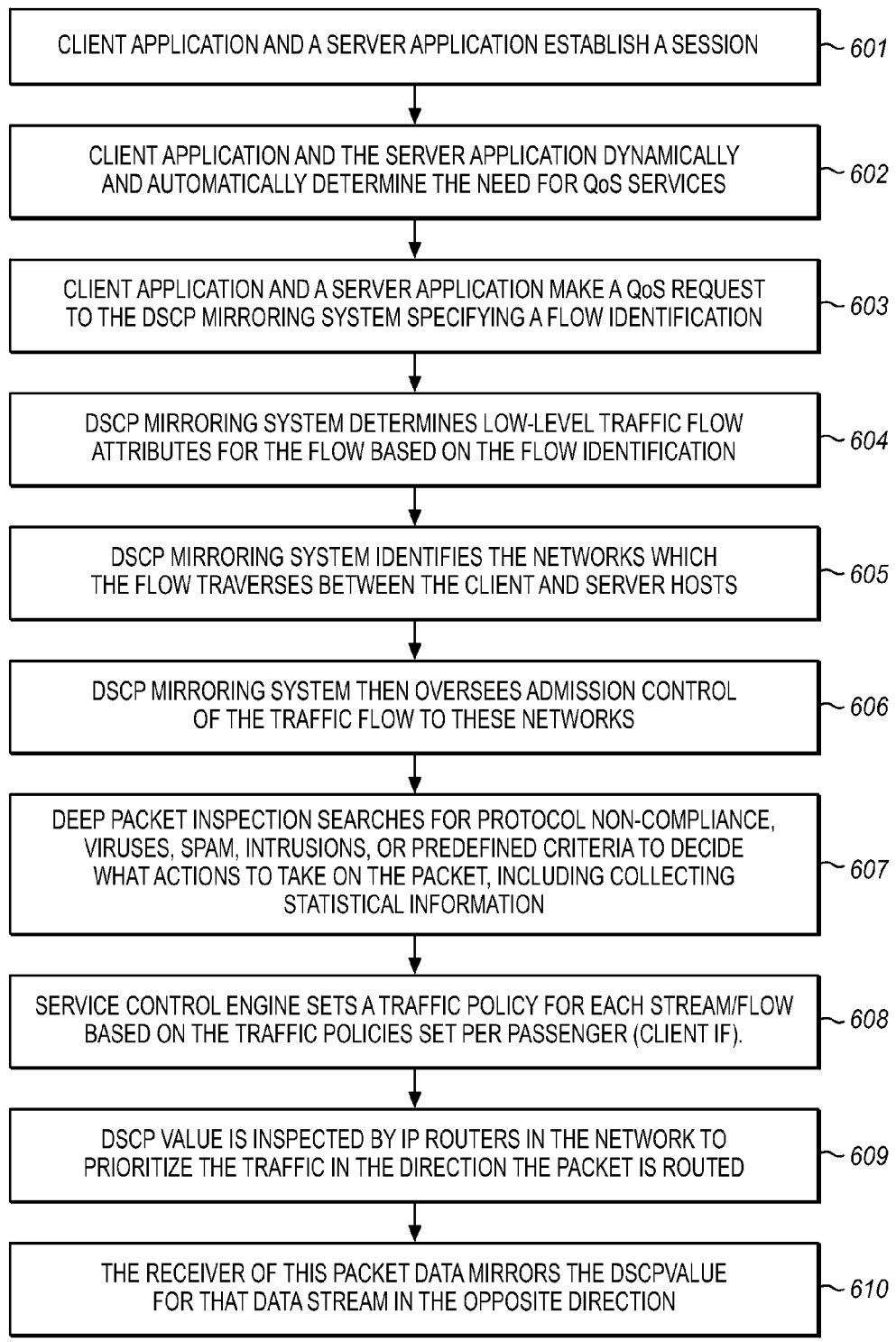
FIG. 6 illustrates in flow diagram form the operation of the DSCP Mirroring System to expedite the flow of data by mirroring the Differentiated Services Code Point header.

FIG. 6 illustrates, in flow diagram form, the operation of the typical DSCP assignment process to create a DSCP header in packet transmissions by the user terminal devices that are served by a network to enable delivery of wireless services to the individually identified user's wireless terminal devices and management of the various data traffic and classes of data to optimize or guarantee performance, low latency, and/or bandwidth, and also provides a unique adaptation that operates without the overhead of the packet-by-packet management of the Differentiated Services Code Point (DSCP) header.

Each client and server computer comprises one or more client/server applications wherein any given instance of a client application establishes a session at step 601 via the networks to a server application and in particular, wherein the client and/or server applications and users of these applications desire QoS services from the networks for the traffic flows moving between the clients and servers.

A DSCP Mirroring System 149 is used at each of a plurality of client and/or server hosts, where client and server applications directly interface the DSCP Mirroring System 149 (also located in Router 125) in order to make QoS requests. Specifically, once a client application and a server application establish a session, the client application, and similarly the server application, dynamically and automatically determine at step 602 when the given traffic flows it is generating needs QoS services from the networks and makes a QoS request at step 603 to the DSCP Mirroring System 149 specifying a flow identification. The DSCP Mirroring System 149 determines low-level traffic flow attributes for the flow at step 604 based on the flow identification and determines the networks the flow traverses between the client and server hosts at step 605. Based on the determined networks, the DSCP Mirroring System 149 then oversees admission control of the traffic flow to these networks at step 606.

Specifically, for each Diff Serv enabled network, either a network control system or the services manager itself performs QoS admission control and bandwidth management for that network. In particular, when a network control system is associated with a network, it performs admission control for new traffic flows to the pre-provisioned traffic classes provisioned in that network. For an admitted traffic flow to a specified traffic class, the network control system returns a DSCP value corresponding to the traffic class. Similarly, the clients and servers may already have an explicit service level agreement with the provider of a network. Here, the services manager directly performs admission control over the service level agreement.

Accordingly, based on a QOS request for a given traffic flow between a client and server, the services manager maps the determined traffic flow attributes to one of the traffic classes supported by each of the determined Diff Serv enabled networks and oversees admission control to these networks by interfacing with the network control systems and/or directly. Assuming each network control system and/or the service manager can admit the new traffic flow to a traffic class of its corresponding network, each determines a DSCP value for its traffic class and returns this DSCP value to the services manager. The services manager then returns to the middleware module at the client or server, depending on the source of the traffic flow, the DSCP value corresponding to the first network the flow traverses. Upon receiving the DSCP value from the services manager, the middleware module configures the client/server to appropriately mark the DSCP field of the transmitted traffic flow packets, thereby completing the overall QoS configuration.

DSCP Mirroring System

Edge routers of the network assign packets from application sessions to traffic classes. The edge routers analyze each packet as it enters the network, classifying the packet according to an assigned traffic class, and insert a specific Differentiated Services Code Point (DSCP) value in the DSCP field of the packet header based on the assigned traffic class. The network routers use a packet's DSCP value to process the packet according to the assigned traffic class.

In the Packet Data Serving Node (PDSN) 143, there are very sophisticated Deep Packet Inspection (DPI) devices that can identify thousands of application flows—this is done in the Service Control Engine (SCE) and Content Filter 150. Deep Packet Inspection (DPI) is the act of any IP network equipment which is not an endpoint of a communication using any field other than the layer 3 destination IP address for any purpose. This is performed at step 607 as the packet passes an inspection point, searching for protocol non-compliance, viruses, spam, intrusions, or predefined criteria to decide what actions to take on the packet, including collecting statistical information. The Service Control Engine at step 608 sets a traffic policy for each stream/flow (source/destination IP and source/destination port) based on the traffic policies set per passenger (client IP). This traffic policy can be a "rate limit", but also can be a DSCP (Differentiated Services Code Point) in the IP header of an IP packet. The DSCP value is inspected by IP Routers in the network at step 609, and the routers supporting DiffServ prioritize the traffic in the direction the packet is routed. The receiver of this packet data mirrors the DSCP value for that data stream in the opposite direction at step 610, such that the traffic is similarly prioritized in the reverse direction, thus providing consistent QoS. More importantly, the limited remote device can leverage the capabilities of the sophisticated Deep Packet Inspection (DPI) device in the data center. Thus, the ability to better classify and prioritize traffic is utilized at remote sites without software change, since the remote router is running a "DSCP mirror" functionality.

SUMMARY

The DSCP Mirroring System enables the automatic reuse of the Differentiated Services Code Point header by the user devices that are served by a network to enable delivery of wireless services to the individually identified user wireless devices and manage the various data traffic and classes of data to optimize or guarantee performance, low latency, and/or bandwidth without the overhead of the management of the Differentiated Services Code Point header.

What is claimed as new and desired to be protected by Letters Patent of the Unite States is:

1. A Differentiated Services Code Point Mirroring System for processing IP packet traffic exchanged between wireless devices, which are located onboard an aircraft and served by an aircraft network, and a ground-based Access Network, which exchanges communication signals with ground-based communication network servers, comprising:
   an IP packet receiver for identifying a Differentiated Services Code Point value stored in a header of an IP packet received by said wireless device; and
   a Differentiated Services Code Point mirroring process for inserting said identified Differentiated Services Code Point value into the header of an IP packet generated by the wireless device in response to said received IP packet.

2. The Differentiated Services Code Point Mirroring System of claim 1, further comprising:
   a Service Control Engine for setting a traffic policy for each stream/flow based on the traffic policies set per wireless device for data traffic between the wireless device and an IP destination server.

3. The Differentiated Services Code Point Mirroring System of claim 1, further comprising:
   a Service Control Engine for prioritizing the data traffic in the direction the packet is routed.

4. A Differentiated Services Code Point Mirroring Process for processing IP packet traffic exchanged between wireless devices, which are located onboard an aircraft and served by an aircraft network, and a ground-based Access Network, which exchanges communication signals with ground-based communication network servers, comprising:
   identifying a Differentiated Services Code Point value stored in a header of an IP packet received by the wireless device; and
   inserting said identified Differentiated Services Code Point value into the header of an IP packet generated by the wireless device in response to said received IP packet.

5. The Differentiated Services Code Point Mirroring Process of claim 4, further comprising:
   setting a traffic policy for each stream/flow based on the traffic policies set per wireless device for data traffic between the wireless device and an IP destination server.

6. The Differentiated Services Code Point Mirroring Process of claim 4, further comprising:
   prioritizing the data traffic in the direction the packet is routed.

7. A Differentiated Services Code Point Mirroring System for processing IP packet traffic received by wireless devices, which are served by a network, comprising:
   an IP packet receiver, located in a router which serves the wireless device, for identifying a Differentiated Services Code Point value stored in a header of a received IP packet; and
   a Differentiated Services Code Point Mirroring Process, located in a router which serves the wireless device, for inserting said identified Differentiated Services Code Point value into the header of an IP packet generated in response to said received IP packet.

8. The Differentiated Services Code Point Mirroring System of claim 7, further comprising:
   a Service Control Engine for setting a traffic policy for each stream/flow based on the traffic policies set per wireless device for data traffic between the wireless device and an IP destination server.

9. The Differentiated Services Code Point Mirroring System of claim 8, further comprising:
   a Service Control Engine for prioritizing the data traffic in the direction the packet is routed.

10. A Differentiated Services Code Point Mirroring Process for processing IP packet traffic received by wireless devices, which are served by a network, comprising:
    identifying, in a router which serves the wireless device, a Differentiated Services Code Point value stored in a header of a received IP packet; and
    inserting, in a router which serves the wireless device, said identified Differentiated Services Code Point value into the header of an IP packet generated in response to said received IP packet.

11. The Differentiated Services Code Point Mirroring process of claim 10, further comprising:
    setting a traffic policy for each stream/flow based on the traffic policies set per wireless device for data traffic between the wireless device and an IP destination server.

12. The Differentiated Services Code Point Mirroring Process of claim 11, further comprising:
    prioritizing the data traffic in the direction the packet is routed.

* * * * *

UNITED STATES PATENT AND TRADEMARK OFFICE
CERTIFICATE OF CORRECTION

PATENT NO. : 8,452,276 B2
APPLICATION NO. : 13/009687
DATED : May 28, 2013
INVENTOR(S) : Bryan A. Lauer Page 1 of 1

It is certified that error appears in the above-identified patent and that said Letters Patent is hereby corrected as shown below:

On the Title Page, Item (63) should be amended as follows:

"Continuation-in-part of application No 12/060,674, filed on Apr. 1, 2008, now Pat. No. 8,081,968, which is a continuation-in-part of application No. 11/492,545, filed on Jul. 24, 2006, now Pat. No. 7,751,815, which is a continuation of application No. 10/730,329, filed on Dec. 7, 2003, now Pat. No. 7,113,780, which is a continuation-in-part of application No. 09/686,923, filed on Oct. 11, 2000, now Pat. No. 6,788,935."

should be deleted and the following language inserted:

--This application is related to U.S. patent application Ser. No. 13/009,579 filed on Jan. 19, 2011.--

Signed and Sealed this
Twenty-ninth Day of July, 2014

Michelle K. Lee
*Deputy Director of the United States Patent and Trademark Office*